(12) United States Patent
Lawson

(10) Patent No.: US 8,403,588 B2
(45) Date of Patent: Mar. 26, 2013

(54) CONNECTION ASSEMBLY

(76) Inventor: Richard John Lawson, Ashbourne (GB)

( * ) Notice: Subject to any disclaimer, the term of this patent is extended or adjusted under 35 U.S.C. 154(b) by 46 days.

(21) Appl. No.: 13/061,103

(22) PCT Filed: Aug. 18, 2009

(86) PCT No.: PCT/GB2009/002017
§ 371 (c)(1),
(2), (4) Date: Feb. 25, 2011

(87) PCT Pub. No.: WO2010/023429
PCT Pub. Date: Mar. 4, 2010

(65) Prior Publication Data
US 2011/0158742 A1 Jun. 30, 2011

(30) Foreign Application Priority Data
Aug. 29, 2008 (GB) .................................. 0815756.2

(51) Int. Cl.
*F16B 9/02* (2006.01)
(52) U.S. Cl. .................................. 403/254; 403/322.4
(58) Field of Classification Search .................. 403/252,
403/254, 255, 322.4, 297, 231, 257, 409.1,
403/374.5
See application file for complete search history.

(56) References Cited

U.S. PATENT DOCUMENTS

| | | | | | |
|---|---|---|---|---|---|
| 4,572,694 | A | * | 2/1986 | Hoeksema | 403/187 |
| 5,048,995 | A | * | 9/1991 | Beaulieu | 403/264 |
| 5,647,682 | A | * | 7/1997 | Riehm | 403/297 |
| 6,478,501 | B1 | * | 11/2002 | Kahl | 403/255 |
| 6,837,389 | B2 | * | 1/2005 | Gassler | 211/189 |
| 2011/0176860 | A1 | * | 7/2011 | Lin | 403/119 |

FOREIGN PATENT DOCUMENTS

| | | |
|---|---|---|
| DE | 29913112 U1 | 10/1999 |
| EP | 0864764 A2 | 9/1998 |

OTHER PUBLICATIONS

Das Neves, Nelson, International Search Report for PCT/GB2009/002017, Dec. 14, 2009.

* cited by examiner

*Primary Examiner* — Joshua Kennedy
(74) *Attorney, Agent, or Firm* — Chernoff Vilhauer McClung & Stenzel LLP

(57) ABSTRACT

A connection assembly 10 usable for interconnecting two extruded square section aluminium elongate members 12. The assembly 10 includes a frame member 18 which locates in an end of the elongate member 12, with a pair of engagement members 28, 38 extending from the elongate member 12. A second engagement member 38 is movable relative to the first engagement member 28 so as to grip in a channel 14 on the other of the elongate members 12 to hold the elongate members 12 together. The second engagement member 38 is movable by a pivotally mounted handle 52 which extends outwardly from the elongate member 12 when the assembly 10 is in an unlocked condition, but locates substantially wholly within a channel 14 when the assembly 10 is in a locked condition.

18 Claims, 4 Drawing Sheets

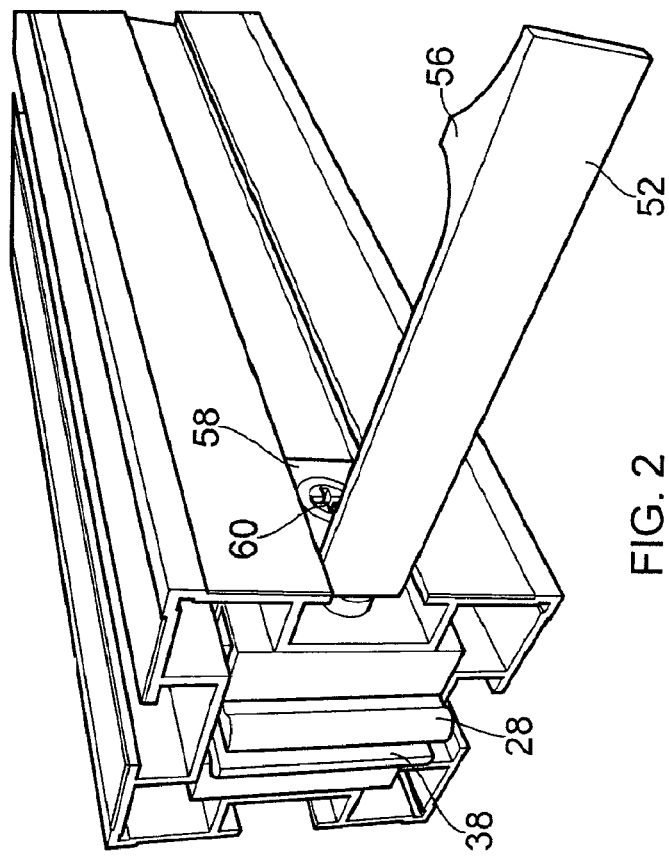
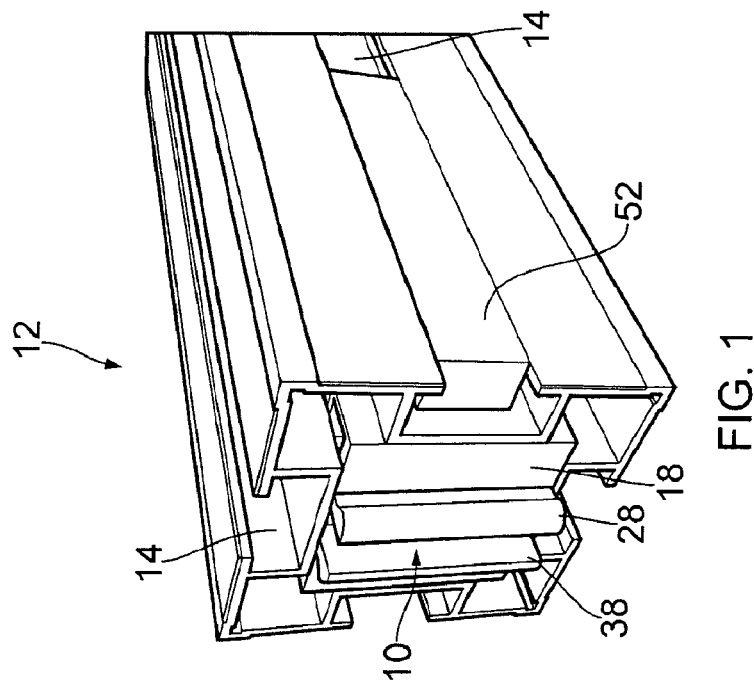

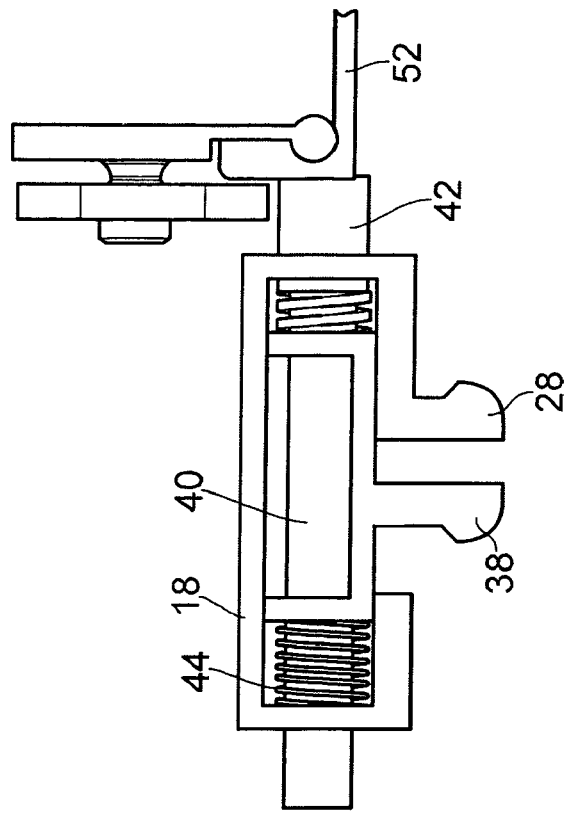
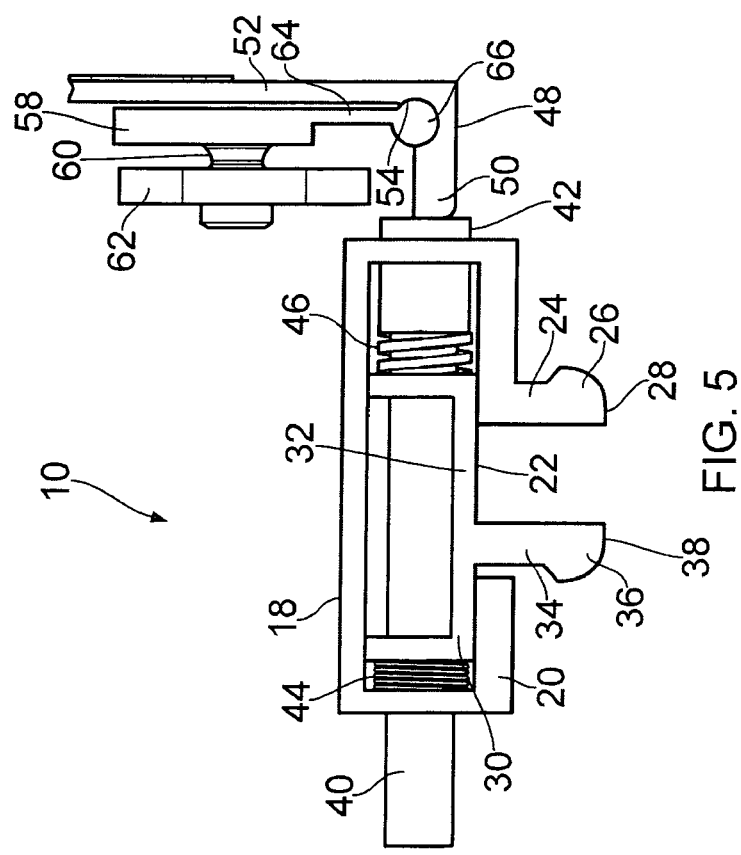

CONNECTION ASSEMBLY

This is a national stage application filed under 35 USC 371 based on International Application No. PCT/GB2009/002017 filed Aug. 18, 2009 and claims priority under 35USC 119 of United Kingdom Patent Application No. GB 0815756.2, filed Aug. 29, 2008.

This invention concerns connection assemblies, and particularly but not exclusively connection assemblies usable for connecting components of a frame of a display apparatus, and also frame assemblies incorporating such connection assemblies.

With display apparatus it is often required for the apparatus to be regularly erected and dismantled for use for instance at different exhibitions or other locations. Existing and previous frame constructions for display apparatus often requires the use of tools to carry out erection and dismantling, which tools may not always be to hand. Also such constructions have often not been sufficiently robust to survive regular erection and dismantling, and particularly by persons who may not use correct procedures for such operations.

Also with display frames, different arrangements and sizes of for instance display panels are often required to be supported. Previously this, often required the cutting of elongate members to required lengths to enable for instance connection arrangements to be mounted in ends thereof.

According to the present invention there is provided a connection assembly, the assembly being locatable in the hollow end of an elongate member for mounting the elongate member to one or more further members, the assembly including a pair of engagement members extending in use from the elongate member, the engagement members being movable relative to each other between an engaged condition and a disengaged condition, the assembly also including a control member operatively connected to one or more of the engagement members for moving the engagement member, the control member being located outside of the elongate member.

The assembly may be arranged such that in an engaged condition the engagement members are spaced further apart than in a disengaged condition.

The connection member may be pivotally movable between a locked position in which the engagement members are in an engaged condition, and an unlocked position in which the engagement members are in a disengaged condition.

The assembly may be arranged such that when in the locked position the control member locates substantially wholly within a channel in the elongate member.

A link member may connect between the control member and a one of the engagement members for moving the latter.

The control member may comprise a handle part on one side of a pivotal mounting, and an abutment part on the opposite side of the pivotal mounting, which abutment part is engageable with the link member to move same.

The abutment part may be configured such that as the control member is pivotally moved to a locked position the location on the abutment part with which the link member is engaging moves away from the pivotal mounting of the control member, thereby moving the link member away from the pivotal mounting.

The assembly may be configured such that in the locked position the handle extends generally parallel to the elongate member. The assembly may also be configured such that in a fully unlocked position the handle part extends generally perpendicularly to the elongate member.

The assembly may include a frame member, and the frame member may slidingly mount the link member. The frame member may rigidly mount or provide a first of the engagement members, and slidingly mount a second of the engagement members.

The second engagement member may be spring urged to a disengaged condition, and a spring may extend between the second engagement member and the frame member.

The second engagement member may be provided on a slide member which is slidably movable relative to the frame member.

The pivotal mounting of the control member may include a part circular section projection on a one of the control member or a mounting member, with the projection engaging in a part circular section recess in the other of the control member or mounting member.

The mounting member may include fastening means for retaining the mounting member on an elongate member, and the fastening means may include a retaining member locatable within the elongate member and a connection member extendible through a hole in the exterior of the elongate member to engage with the retaining member.

The link member may be slidingly extendible through the elongate member between holes in the exterior of the elongate member. The control member may have an engagement formation engageable with a one of the engagement members for moving same, and an override resilient member may extend between the engagement formation and said one engagement member.

The invention also provides a frame assembly, the assembly comprising two elongate members with one or more longitudinal channels on the exterior of each of the elongate members, and a connection assembly according to any of the preceding fourteen paragraphs, the connection assembly being mounted in the end of a first of the elongate members, with the engagement members being selectively engageable with a channel on the second of the elongate members, to mount together the first and second elongate members.

The frame member may have a sliding fit within the end of the first elongate member.

The handle part of the connection assembly may locate substantially wholly within a channel of the first elongate member when in a locked position.

The channels of the elongate member may have flanges extending along their openings such that the openings of the channels are narrower than the remainder of the channels.

The elongate members may be extrusions, and may be aluminium extrusions.

An embodiment of the present invention will now be described by way of example only and with reference to the accompanying drawings, in which:

FIG. 1 is a perspective end view of a connection assembly according to the invention mounted in the end of an elongate member, when in a locked condition;

FIG. 2 is a similar view to FIG. 1 but with the connection assembly in an unlocked condition;

FIG. 5 is a diagrammatic plan view of the connection assembly of FIG. 1 in a locked condition;

FIG. 6 is a similar view to FIG. 5 but in an unlocked condition; and

Figure 4:
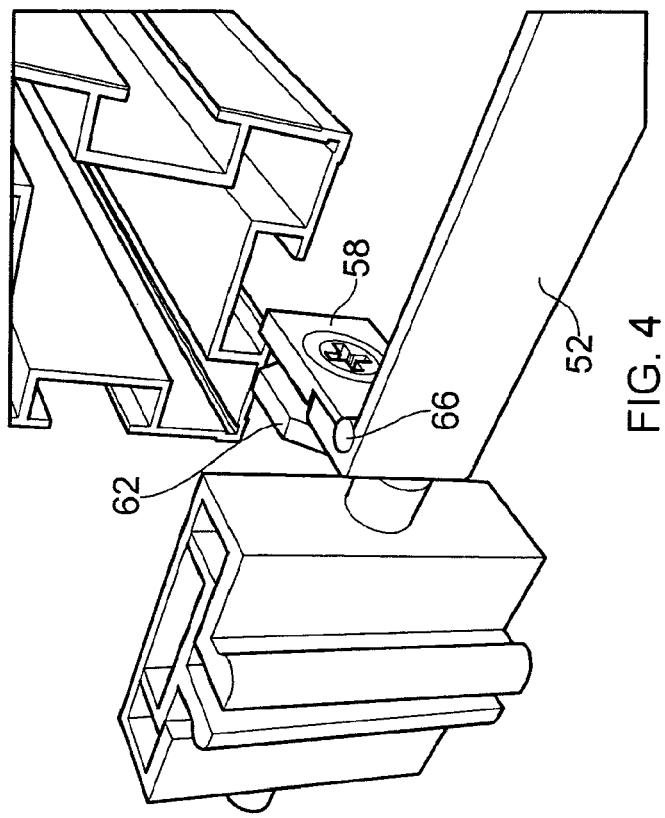
FIG. 4 is a similar view to FIG. 3 but with the connection assembly in an unlocked condition.

The drawings show a connection assembly 10 usable for interconnecting two extruded square section aluminium elongate members 12. Each of the elongate members 12 has a channel 14 on each face with flanges 16 on either side of the opening of the channel 14 such that the channel has a reduced size opening relative to the remainder of the channel 14.

The assembly 10 includes a frame member 18 which when viewed from above as in FIGS. 5 and 6, is of channel section with flanges 20 on one side leading to an opening 22. On the right hand flange 20 an extension 24 with an enlarged head 26 is provided which forms a first fixed engagement member 28.

A slider member 30 is located within the frame 18 and has a U-shape section part 32 which is too wide to pass through the opening 22. The member 30 includes an extension 34 with an enlarged head 36, which provides a movable engagement member 38 which is movable towards and away from the engagement member 28.

A link member 40 in the form of a length of bar with an enlarged head 42 at the right hand end as shown in FIGS. 5 and 6, extends through the frame member 18, and is slidingly movable through aligned holes therein. The link member 40 also extends through the slider 30 through aligned holes, but the aligned holes in the slider 30 are of a size that the enlarged head 42 cannot pass therethrough.

A return spring 44 is provided around the link member 40 between the slider 30 and a left hand end of the frame member 18 as shown in FIGS. 5 and 6. An override spring 46 is provided around the link member 40 between the right hand end of the slider 30 and the enlarged head 42.

A control member 48 is engageable against the end of the enlarged head 42 outside of the frame member 18, i.e. at the right hand side as shown in FIGS. 5 and 6. The control member is of generally L-shaped configuration with a short base which forms an abutment member 50 and a long stem which forms a handle 52. A part circular recess 54 is provided in the connection between the abutment member 50 and handle 52. A spacer extension 56 is provided on the inside of the handle 52 towards the free end thereof.

A mounting member 58 is provided with a bolt 60 threadably engageable with a mounting plate 62 spaced from where the bolt 60 is extendible through the mounting member 58. A web 64 is provided on the mounting member 58 with a substantially circular cross section head 66 on the end of the web 64, which head is engageable in the recess 54 to provide a pivotal mounting of the control member 48 on the mounting member 58.

The assembly 10 can be mounted in the end of an elongate member 12 as shown in FIGS. 1 to 4. The frame member 18 slidingly fits within the interior of the elongate member 12. Holes (not shown) will be provided through side channels 14 of the elongate member 12 to permit respectively the link member 40 and the enlarged head 42 to pass therethrough. A mounting hole will also be provided in the same side channel 14 as that with a hole for the enlarged head. The mounting hole is spaced further from the end of the member 12, and can receive the bolt 60 extending therethrough with the mounting plate 62 on the interior of the elongate member 12 to retain the assembly 10 in position.

Figure 3:
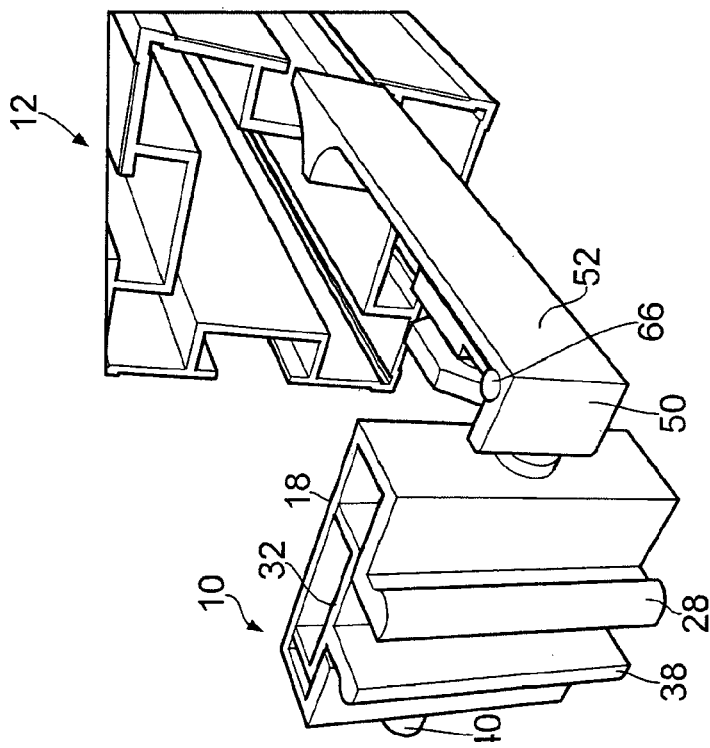
FIG. 3 is a similar, view to FIG. 1 but with the connection assembly removed from the end of the elongate member.

FIGS. 1, 3 and 5 show the assembly 10 in a locked condition, with the handle 52 perpendicular to the link member 40. In this condition the abutment member 50 urges the link member to the left as shown in FIGS. 5 and 6 against the force of the return spring 44. This urges the movable engagement member 38 to the left and thus away from the fixed engagement member 28.

The handle 52 is pivoted outwardly away from the elongate member 12 to move the assembly 10 to an unlocked condition. In this condition the enlarged head 42 of the link member 40 engages against the abutment member 50 closer to the pivotal mounting provided by the head 66 and thus the link member 40 moves to the right as shown in FIGS. 5 and 6 urged by the spring 44, and hence the movable engagement member 38 moves to the right and hence towards the fixed engagement member 28. The shape of the abutment member 50 is such that the control member 48 will rest either in the locked or unlocked condition.

Figure 7:
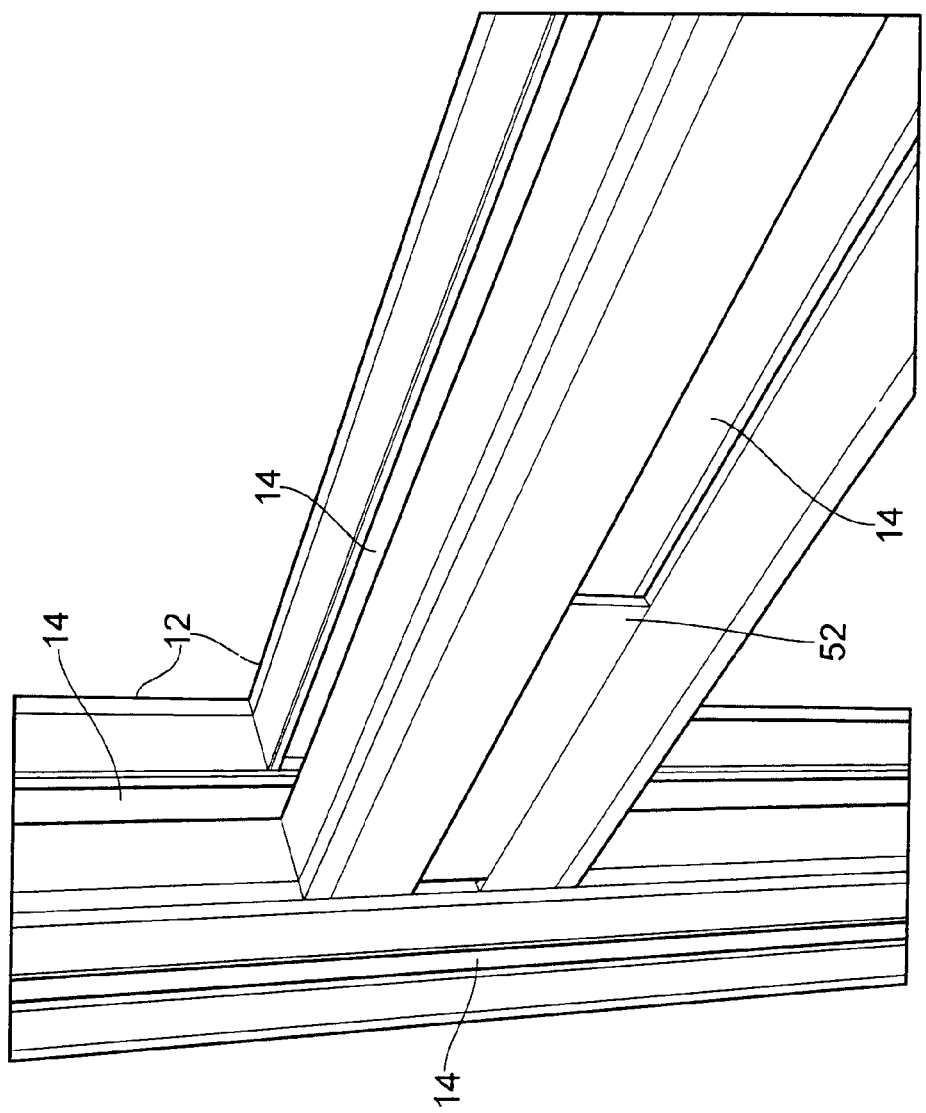
FIG. 7 is a diagrammatic perspective view showing two elongate members connected by the assembly of FIG. 1.

To join together two elongate members 12 perpendicularly as shown in FIG. 7, the connection assembly 10 is moved to an unlocked condition as shown in FIG. 6 and outlined above. The horizontal elongate member 12 as shown in FIG. 7 can then be brought to the vertical elongate member 12 with the engagement members 28, 38 locating in a side channel 14 of the vertical elongate member 12.

Once in position the handle 52 can be pivoted back towards the horizontal elongate member 12 causing the movable engagement member 38 to move away from the fixed engagement member 28 such that the engagement members 28, 38 engage in the side channel 14 of the vertical elongate member 12 to retain the horizontal elongate member in position thereon. The handle 52 will be fully rotated so as to locate within the channel 14 on the horizontal elongate member 12.

If required, the horizontal elongate member 12 can be moved along or removed from the vertical elongate member simply by moving the handle 52 away from the elongate member 12 such that the engagement members 28, 38 no longer lockingly engage in the channel 14.

There is thus described a connection assembly which provides a number of advantages. The assembly permits connection of an elongate member at any position on another elongate member without the requirement for cutting elongate members to particular lengths. Furthermore, no tools are required to mount or disconnect the elongate members. The assembly could be used to coaxially interconnect elongate members, by mounting a perpendicular engagement member across the joint between two coaxial elongate members.

When locked the handle locates fully within the channel and therefore does not protrude in any way, and for instance display material could be mounted thereover. The connection assembly only requires one single fastening to hold it in position on an elongate member, and in use no tools are required to move or remove the connection assembly.

Whilst the above assembly has been described in relation to the mounting together of elongate lengths of aluminium frame used in display apparatus, it is to be realised that the invention could be used in a wide range of applications and with different materials.

Various modifications can also be made to the apparatus without departing from the scope of the invention. For example, a different pivotal mounting of the handle could be used. Engagement members may take a different form. Different means could be provided for fastening the connection assembly to an elongate member.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:
1. A connection assembly, the assembly being locatable in the hollow end of an elongate member for mounting the elongate member to one or more further members, the assembly including a pair of engagement members, the engagement members being movable relative to each other between an engaged condition and a disengaged condition, the assembly also including a control member operatively connected to one or more of the engagement members for moving the engagement member, the assembly including a frame member which slidingly mounts a link member, which link member connects between the control member and a one of the engagement members for moving the latter, the frame member rigidly mounting or providing a first of the engagement members, and slidingly mounting a second of the engagement members, the second engagement member being provided on a slider member which is slidably movable within the frame member.

2. A connection assembly according to claim 1, characterised in that the assembly is arranged such that in an engaged condition the engagement members are spaced further apart than in a disengaged condition.

3. A connection assembly according to claim 1, characterised in that the control member is pivotally movable between a locked position in which the engagement members are in an engaged condition, and an unlocked position in which the engagement members are in a disengaged condition.

4. A connection assembly according to claim 3, characterised in that the abutment part is configured such that as the control member is pivotally moved to the locked position the location on the abutment part with which the link member is engaging moves away from a pivotal mounting of the control member, thereby moving the link member away from the pivotal mounting.

5. A connection assembly according to claim 3, characterised in that the assembly is configured such that in the locked position the handle part extends generally parallel to the elongate member and the assembly may be configured such that in a fully unlocked position the handle part extends generally perpendicularly to the elongate member.

6. A connection assembly according to claim 3, characterised in that the control member is pivotally mounted on a pivotal mounting that includes a part circular section projection on a one of the control member or a mounting member, with the projection engaging in a part circular section recess in the other of the control member or mounting member.

7. A connection assembly according to claim 6, characterised in that the mounting member includes fastening means for retaining the mounting member on an elongate member.

8. A connection assembly according to claim 7, characterised in that the fastening means includes a retaining member locatable within the elongate member and a connection member extendible through a hole in the exterior of the elongate member to engage with the retaining member.

9. A connection assembly according to claim 1, characterised in that the control member comprises a handle part on one side of a pivotal mounting, and an abutment part on the opposite side of the pivotal mounting, which abutment part is engageable with the link member to move same.

10. A connection assembly according to claim 1, characterised in that the second engagement member is spring urged to a disengaged condition.

11. A connection assembly according to claim 1, characterised in that a spring extends between the second engagement member and the frame member.

12. A connection assembly according to claim 1, characterised in that the link member is slidingly extendible through the elongate member between holes in the exterior of the elongate member.

13. A connection assembly according to claim 1, characterised in that the link member has an engagement formation engageable with a one of the engagement members for moving same, and an override resilient member extends between the engagement formation and said one engagement member.

14. A frame assembly, the assembly comprising two elongate members with one or more longitudinal channels on the exterior of each of the elongate members, and a connection assembly according to claim 1, the connection assembly being mounted in the end of a first of the elongate members, with the engagement members being selectively engageable with a channel on the second of the elongate members, to mount together the first and second elongate members.

15. A connection assembly according to claim 14, characterised in that the assembly may be arranged such that when in the locked position the control member locates substantially wholly within a channel in the elongate member.

16. A frame assembly according to claim 14, characterised in that the frame member has a sliding fit within the end of the first elongate member.

17. A frame assembly according to claim 14, characterised in that the handle part of the connection assembly locates substantially wholly within a channel of the first elongate member when in a locked position which channels of the elongate members may have flanges extending along their openings such that the openings of the channels are narrower than the remainder of the channels.

18. A frame assembly according to claim 14, characterised in that the elongate members are extrusions which may be aluminum extrusions.

* * * * *